US011662212B2

(12) United States Patent
Efland

(10) Patent No.: US 11,662,212 B2
(45) Date of Patent: May 30, 2023

(54) SYSTEMS AND METHODS FOR PROGRESSIVE SEMANTIC MAPPING

(71) Applicant: Lyft, Inc., San Francisco, CA (US)

(72) Inventor: Kris Richard Efland, Lafayette, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 17/573,434

(22) Filed: Jan. 11, 2022

(65) Prior Publication Data

US 2022/0128366 A1 Apr. 28, 2022

Related U.S. Application Data

(63) Continuation of application No. 16/447,702, filed on Jun. 20, 2019, now Pat. No. 11,248,914.

(51) Int. Cl.
G01C 21/32 (2006.01)
G01C 21/36 (2006.01)

(52) U.S. Cl.
CPC ........... G01C 21/32 (2013.01); G01C 21/367 (2013.01); G01C 21/3691 (2013.01); G01C 21/3697 (2013.01)

(58) Field of Classification Search
CPC .. G01C 21/32; G01C 21/367; G01C 21/3691; G01C 21/3697
USPC ...................................................... 701/532
See application file for complete search history.

(56) References Cited

U.S. PATENT DOCUMENTS 8,140,076 B2 3/2012 Ponce de Leon et al.
10,976,421 B2 4/2021 Zhang et al.
2006/0190163 A1* 8/2006 Anderson ............. G01C 21/20 455/456.1
2007/0004394 A1* 1/2007 Chu ...................... H04W 24/08 455/422.1
2009/0005073 A1 1/2009 Shaffer et al.
(Continued)

FOREIGN PATENT DOCUMENTS

AU 2007286433 A1 * 4/2009 ............. G01C 21/26
CN 103582893 2/2014
(Continued)

OTHER PUBLICATIONS

Ruben et al., "Efficient Automotive Grid Maps using a Sensor Ray based Refinement Process," 2016, Publisher: IEEE.*
(Continued)

*Primary Examiner* — Tuan C To
(74) *Attorney, Agent, or Firm* — Sheppard Mullin Richter & Hampton LLP

(57) ABSTRACT

Systems, methods, and non-transitory computer-readable media can determine map information defining a map, wherein the map comprises a plurality of regions. A quality level is assigned to each region of the plurality of regions based on map information available for that region. The quality level is associated with at least one of: a resolution metric, a volume metric, a recency metric, a verification metric, or an elegance metric associated with the map information available for that region. A first region of the plurality of regions is identified that is at risk of being downgraded to a lower quality level. Instructions are issued to one or more vehicles that cause the one or more vehicles to traverse the first region and capture sensor data within the first region.

20 Claims, 11 Drawing Sheets

(56) References Cited

U.S. PATENT DOCUMENTS

| | | | |
|---|---|---|---|
| 2009/0005097 A1* | 1/2009 | Shaffer | G01C 21/3461 |
| | | | 455/517 |
| 2011/0148610 A1 | 6/2011 | Snider et al. | |
| 2012/0253529 A1* | 10/2012 | Carlson | A01G 25/167 |
| | | | 700/284 |
| 2013/0222589 A1* | 8/2013 | Lalonde | G08G 1/165 |
| | | | 348/148 |
| 2013/0321472 A1* | 12/2013 | Piemonte | G06F 1/1626 |
| | | | 345/672 |
| 2015/0197010 A1 | 7/2015 | Ruuspakka et al. | |
| 2015/0269785 A1* | 9/2015 | Bell | G06T 19/003 |
| | | | 345/427 |
| 2016/0092615 A1* | 3/2016 | Stenneth | G01W 1/00 |
| | | | 703/6 |
| 2016/0234578 A1 | 8/2016 | Sareen et al. | |
| 2016/0246272 A1* | 8/2016 | Srivastava | G06Q 50/06 |
| 2017/0150371 A1 | 5/2017 | Cichonski | |
| 2018/0017973 A1* | 1/2018 | Teague | G05D 1/0005 |
| 2018/0249298 A1 | 8/2018 | Jain et al. | |
| 2018/0376306 A1* | 12/2018 | Ramalho de Oliveira | |
| | | | H04W 88/10 |
| 2019/0094859 A1 | 3/2019 | Nix et al. | |
| 2019/0339694 A1 | 11/2019 | Akman | |
| 2020/0264629 A1 | 8/2020 | Maveddat et al. | |

FOREIGN PATENT DOCUMENTS

| | | |
|---|---|---|
| WO | 2014145471 | 9/2014 |
| WO | WO-2022149046 A1 * | 7/2022 |

OTHER PUBLICATIONS

S.S. Saab et al., "Map-Based Land Vehicle Navigation System with DGPS," 2002, vol. 1, Publisher: IEEE.*

Kamijo, Shunichiro, et al., "Digital Road Map Data Base for Vehicle Navigation and Road Information Systems," 1989, Publisher: IEEE, 5 pages.

Wakim, Rachel, et al., "An Autonomous System for High-Resolution Mapping of Indoor Wireless Coverage," 2017, Publisher: IEEE, 5 pages.

* cited by examiner

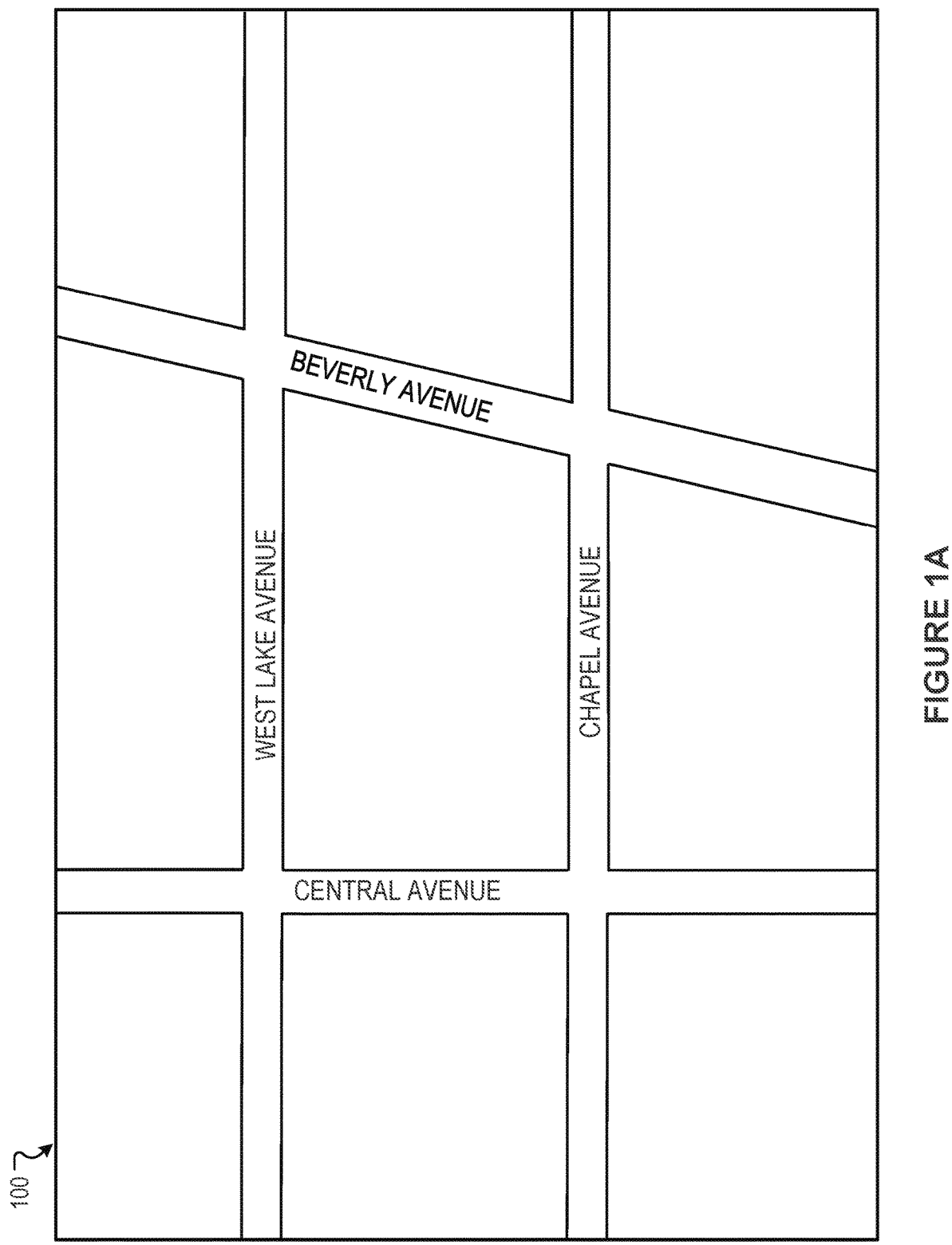

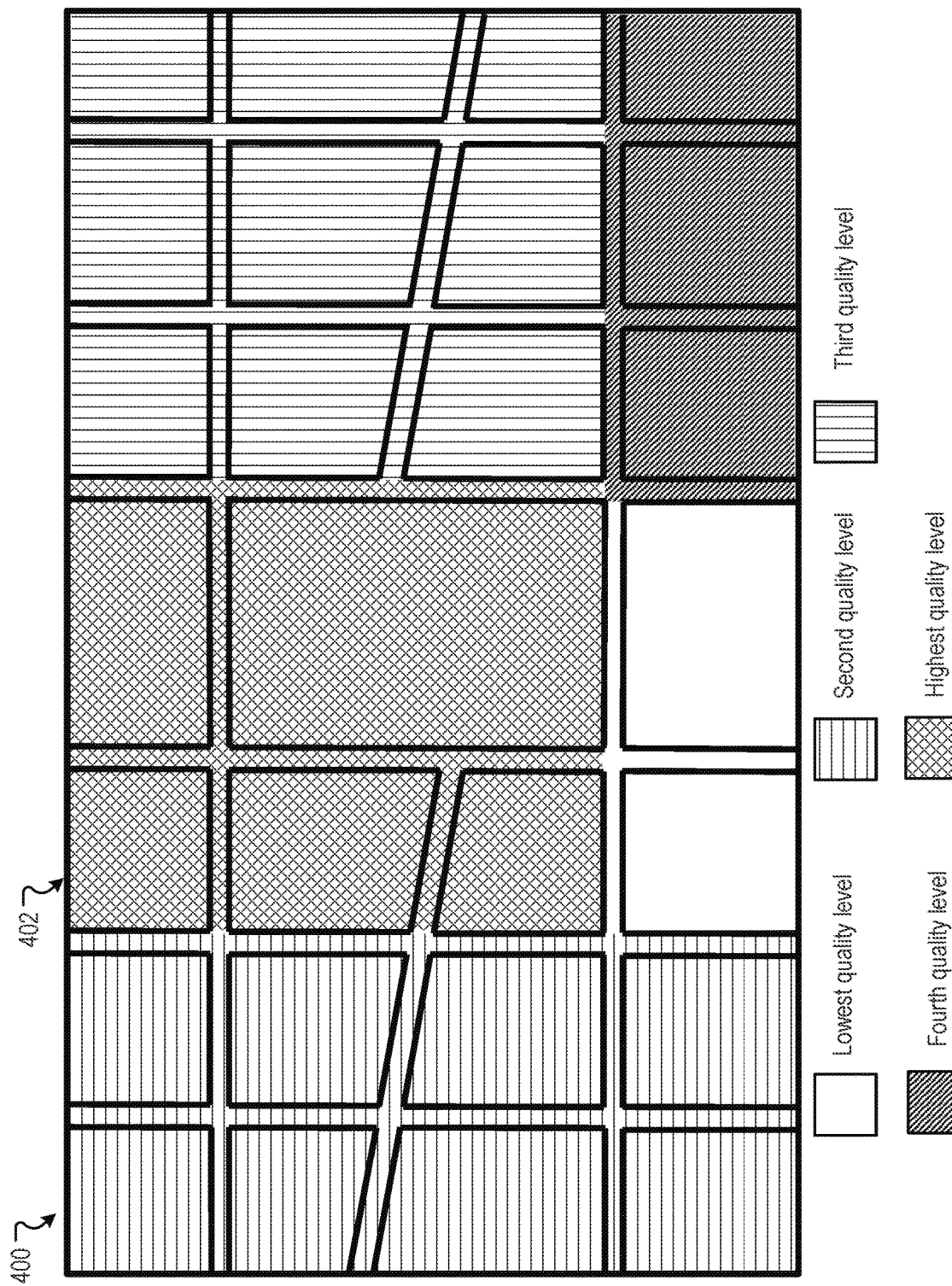

SYSTEMS AND METHODS FOR PROGRESSIVE SEMANTIC MAPPING

This application is a continuation of U.S. patent application Ser. No. 16/447,702, filed on Jun. 20, 2019 and entitled "SYSTEMS AND METHODS FOR PROGRESSIVE SEMANTIC MAPPING", which is incorporated in its entirety herein by reference.

FIELD OF THE INVENTION

The present technology relates to vehicle systems and navigation systems. More particularly, the present technology relates to systems, apparatus, and methods for progressively updating map data based on input data obtained from various sources.

BACKGROUND

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input as appropriate. The vehicle may include a variety of systems and subsystems for enabling the vehicle to determine its surroundings so that it may safely navigate to target destinations or assist a human driver, if one is present, with doing the same. As one example, the vehicle may have a computing system (e.g., one or more central processing units, graphical processing units, memory, storage, etc.) for controlling various operations of the vehicle, such as driving and navigating. To that end, the computing system may process data from one or more sensors. For example, a vehicle may have sensors that can recognize hazards, roads, lane markings, traffic signals, and the like. Data from sensors may be used to, for example, safely drive the vehicle, activate certain safety features (e.g., automatic braking), and generate alerts about potential hazards.

SUMMARY

Various embodiments of the present technology can include systems, methods, and non-transitory computer readable media configured to determine map information defining a map, wherein the map comprises a plurality of regions. A quality level is assigned to each region of the plurality of regions based on map information available for that region. The quality level is associated with at least one of: a resolution metric, a volume metric, a recency metric, a verification metric, or an elegance metric associated with the map information available for that region. A first region of the plurality of regions is identified that is at risk of being downgraded to a lower quality level. Instructions are issued to one or more vehicles that cause the one or more vehicles to traverse the first region and capture sensor data within the first region.

In an embodiment, input data pertaining to the first region is received. Map information associated with the first region is updated based on the input data.

In an embodiment, the quality level for the first region is updated based on the updated map information.

In an embodiment, the input data comprises sensor data captured by one or more sensors mounted to the one or more vehicles while driving through the first region.

In an embodiment, updated map information is transmitted to one or more vehicles based on the updating the map information associated with the first region.

In an embodiment, the first region is assigned a first quality level of a plurality of quality levels. The first quality level is indicative of AV-quality map information that would permit operation of an autonomous vehicle within the first region.

In an embodiment, a rideshare request is assigned to an autonomous vehicle based on the first region being assigned the first quality level of the plurality of quality levels.

In an embodiment, issuing instructions to the one or more vehicles that cause the one or more vehicles to traverse the first region and capture sensor data within the first region comprises issuing instructions that cause one or more autonomous vehicles to traverse the first region and capture sensor data within the first region.

In an embodiment, input data pertaining to the first region is received. The input data is indicative of a change to one or more map elements within the first region. The quality level assigned to the first region is downgraded based on the input data.

In an embodiment, assigning the quality level to each region of the plurality of regions based on map information available for that region comprises assigning one quality level of a plurality of quality levels to each region of the plurality of regions. Each quality level of the plurality of quality levels is associated with a set of quality criteria. Each region is assigned the highest quality level for which the associated set of quality criteria is satisfied.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF THE DRAWINGS

FIGS. 1A and 1B illustrate example situations demonstrating various challenges that may be experienced in conventional approaches to map generation.

FIG. 4B illustrates example map information, according to an embodiment of the present technology.

Figure 1B:
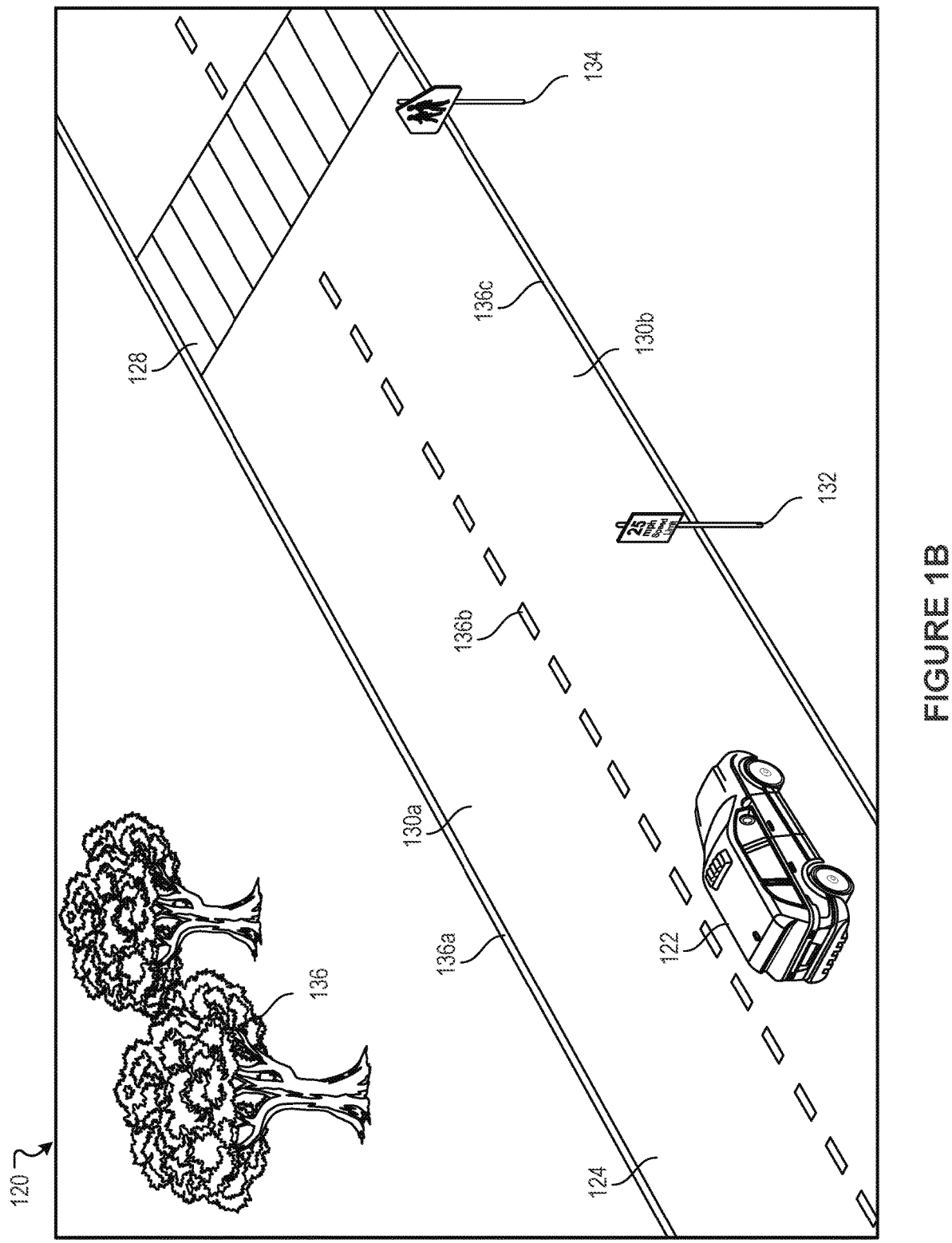

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input. The vehicle may include a variety of systems and subsystems for enabling the vehicle to determine its surroundings so that it may safely navigate to target destinations or assist a human driver, if one is present, with doing the same. As one example, the vehicle may have a computing system for controlling various operations of the vehicle, such as driving and navigating. To that end, the computing system may process data from one or more sensors. For example, a vehicle may have one or more sensors or sensor systems that can recognize hazards, roads, lane markings, traffic signals, etc. Data from sensors may be used to, for example, safely drive the vehicle, activate certain safety features (e.g., automatic braking), and generate alerts about potential hazards.

Mapping is also fundamental to operating a vehicle autonomously or semi-autonomously. However, being able to collect maps at scale is costly, technically challenging, and requires heavy capital investment. Furthermore, the delta between a simple map used for consumer applications and a map needed for an autonomous vehicle is large and requires a significant increase in investment and capability to deliver. FIG. 1A illustrates an example of a simple map 100 that may be used for consumer applications. The simple map 100 may be two-dimensional, and may include basic positions and directions of roads in a geographic region. However, such simple maps do not contain sufficient information for autonomous or semi-autonomous vehicle navigation.

For autonomous or semi-autonomous navigation, vehicles may rely on complex three-dimensional maps that contain very precise geometric and semantic information. For example, an AV-quality map of a geographic region can include geometric information pertaining to geometric features (e.g., physical features) that correspond to the geographic region. Such geometric information may include, for example, positions and/or shapes of physical structures or objects or other physical features in a geographic region. For example, FIG. 1B illustrates an example environment 120 being traveled by a vehicle 122 while navigating a road segment 124. An AV-quality map may include three-dimensional geometric information that identifies various physical features (e.g., trees 136, road signs 132, 134, crosswalk 128, etc.) and their positions within the environment 100.

In order to perform autonomous or semi-autonomous navigation, a vehicle requires information not only about the geometric, physical features in an area, but also contextual (or semantic) information about those physical features. For example, in the example shown in FIG. 1B, an AV-quality map may include geometric information which indicates the position of the road segment 124 and/or the positions of various physical features, such as the trees 136 or signs 132, 134 proximate the road segment 124. However, in order to autonomously navigate the road segment 124, the vehicle 122 also needs to know that the road segment 124 has two lanes 130a, 130b, the precise positions of boundary lines 136a-c defining the lanes 130a, 130b, the direction of travel in each lane 130a, 130b, the speed limit of the road segment 124, the fact that a crosswalk 128 crosses the road segment 124, the precise position of the crosswalk 128, and the like. However, generating such detailed three-dimensional AV-quality maps that are suitable for use in autonomous or semi-autonomous navigation is extremely costly, time intensive, and technically challenging. There is currently a lack of available solutions for generating such detailed, precise AV-quality maps in a scalable, efficient manner that are not purely capital intensive. Conventional approaches pose disadvantages in addressing these and other problems.

An improved approach in accordance with the present technology overcomes the foregoing and other disadvantages associated with conventional approaches. In various embodiments, the present technology provides a holistic pipeline that progressively builds a higher quality map with the ingestion of richer and/or more voluminous input data or data at some "sufficient" volume. In an embodiment, such input data may be received from users (e.g., a computing device associated with the user) and/or vehicles (e.g., one or more sensors on the vehicle) traversing a geographic region. For example, at least some of the input data may be received from drivers, riders, and/or vehicles traversing certain geographic regions as part of a ridesharing service. Map information defining a map may be generated and updated based on the input data. The map may comprise varying degrees of quality in different regions of the map (e.g., based on the types of sensors that were used to collect data in each region). For example, certain regions of the map may comprise a lowest level of quality, certain regions of the map may comprise a highest level of quality (e.g., AV-quality), and other regions of the map may comprise one or more intermediate levels of quality. In an embodiment, each region of the map may be assigned a quality level (e.g., a quality score) indicative of the quality of the map information available for that region based on various quality criteria. In an embodiment, base map information may be received which defines a lowest quality level in the map. For example, the base map information may comprise two-dimensional map information with sufficient data for navigation routing and/or ETA calculation. The base map information may be suitable, for example, for providing driving instructions to a human driver but may be unsuitable for autonomous or semiautonomous navigation.

Over time, as input data pertaining to a geographic region is received, the map information for that region may be augmented and improved using the additional input data. In various embodiments, the progressive ingestion of input data may have a step function nature where key elements are added to the map using automated approaches. Map features, such as lanes, lane markings, stop signs, crosswalks, traffic lights, and other semantic information can be progressively added to the map information and their accuracy improved over time as more (and/or sufficient) input data is received. In an embodiment, when a section or region of a map is assigned a particular quality level based on satisfaction of certain quality criteria, the present technology can automatically schedule and/or queue up appropriate resources for achieving a next set of quality criteria in order to upgrade that region to a higher quality level. This may include, for example, automating data collection in specific areas to fill in any missing gaps, instructing vehicles with varying levels of sensor suites (e.g., autonomous, human-driven, etc.) for high quality data collection, generating projects for human operators to curate sections of the map to AV quality, generating simulations to evaluate map information in a region, and the like. This process may continue until a region reaches AV quality, at which point the region may be marked as such (e.g., assigned a quality level or quality score indicative of AV quality). Regions that are associated with AV-quality map information may then be unlocked for autonomous vehicles to operate (e.g., within an operational design domain (ODD) commensurate with the relative AV quality score of the available map routes). Map information can continuously be updated, and appropriate actions can be scheduled and/or queued based on updated input data as it is received. In various embodiments, geographic regions, as discussed herein, may comprise a single road segment, a portion of a road segment, or multiple road segments. More details relating to the present technology are provided below.

Figure 2:
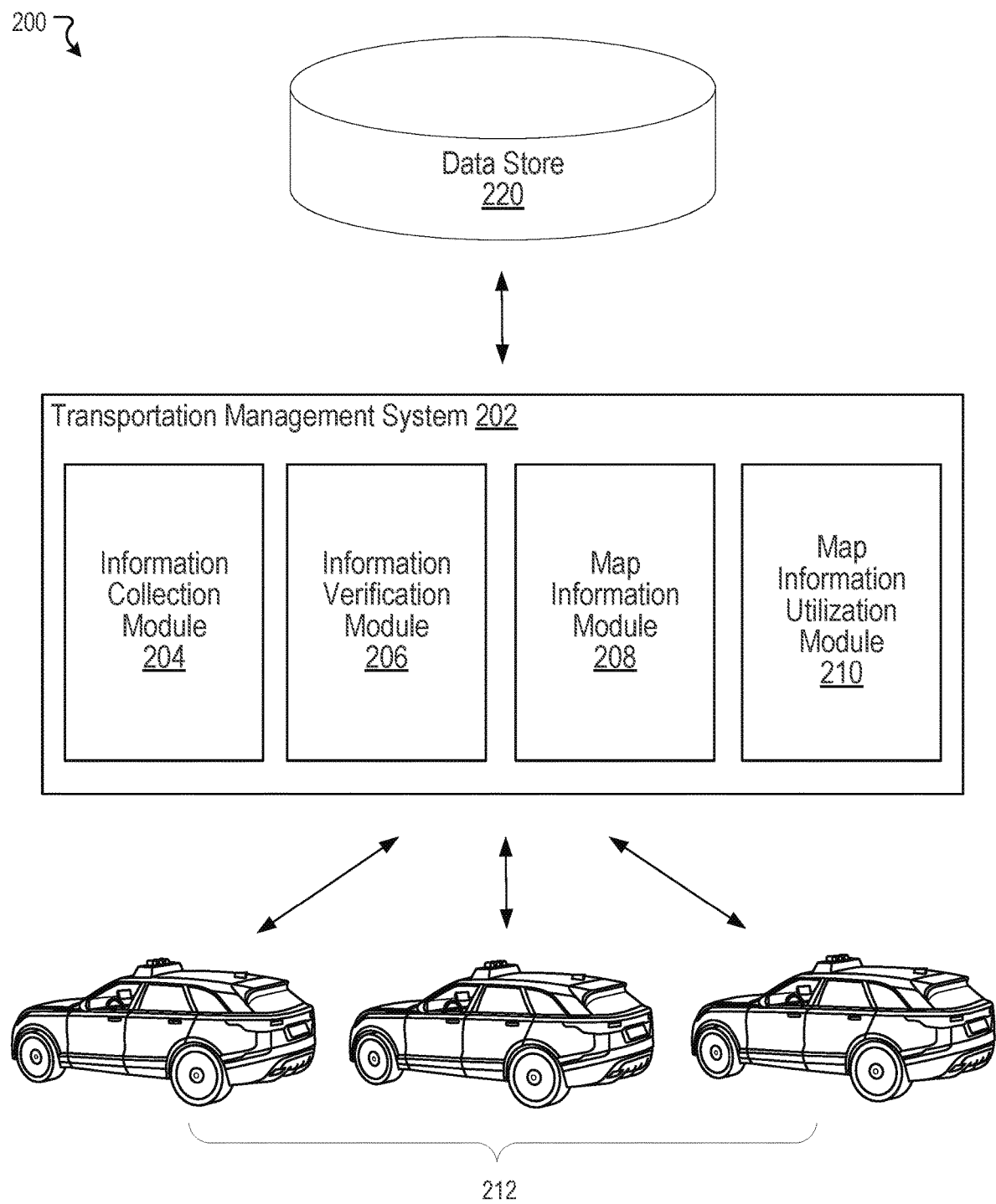
FIG. 2 illustrates an example environment including a transportation management system, according to an embodiment of the present technology.

FIG. 2 illustrates an example environment 200, according to an embodiment of the present technology. The environment 200 can include an example transportation management system 202 and a fleet of vehicles 212. The fleet of vehicles 212 may be managed by the transportation management system 202. The transportation management system 202 can be, for example, a transportation management system 660 of FIG. 6. The fleet of vehicles 212 can be, for example, a fleet comprised of one or more vehicles, such as a vehicle 640 of FIG. 6. As shown, the transportation management system 202 can include an information collection module 204, an information verification module 206, a map information module 208, and a map information utilization module 210. In various embodiments, the transportation management system 202 can access sensor data collected by sensors of the fleet of vehicles 212 from various sources and geographic locations. Sensor data may be collected by sensors mounted to the vehicles themselves and/or sensors on computing devices associated with users riding within the fleet of vehicles 212 (e.g., user mobile devices). For example, the transportation management system 202 can access sensor data from the fleet of vehicles 212 in real-time (or near real-time) over one or more computer networks. In another example, the transportation management system 202 can be configured to communicate and operate with at least one data store 220 that is accessible to the transportation management system 202. The at least one data store 220 can be configured to store and maintain various types of data, such as sensor data captured by the fleet of vehicles 212, map information, and the like. In general, sensor data captured by the fleet of vehicles 212 (e.g., point cloud data, image data, video data, acoustic data, etc.) can provide geometric and/or semantic information pertaining to geographic locations. In some embodiments, some or all of the functionality performed by the transportation management system 202 and its sub-modules may be performed by one or more computing systems implemented in a vehicle, such as the vehicle 640 of FIG. 6. In some embodiments, some or all of the functionality performed by the transportation management system 202 and its sub-modules may be performed by one or more computing systems associated with (e.g., carried by) one or more users riding in a vehicle and/or participating in a ridesharing service, such as the computing device 630 of FIG. 6. The components (e.g., modules, elements, etc.) shown in this figure and all figures herein are exemplary only, and other implementations may include additional, fewer, integrated, or different components. Some components may not be shown so as not to obscure relevant details.

The information collection module 204 can be configured to receive base map information. As will be discussed in greater detail herein, base map information may define a lowest quality level for a map generated and maintained using the presently disclosed technology. In an embodiment, base map information may comprise sufficient information to provide basic navigation or travel directions to a human driver, but may comprise insufficient information for autonomous navigation. For example, base map information may comprise a two-dimensional map that is utilized to provide navigation guidance and route guidance to drivers in a ridesharing service. In certain embodiments, base map information may comprise public transit information (e.g., public transit stop locations and schedules) that can be used to provide navigation guidance and/or route guidance for users utilizing a public transit system.

The information collection module 204 can be further configured to receive input data for updating and/or improving map information. In an embodiment, the input data can comprise sensor data captured by one or more sensors or map data provided by third party sources. In certain embodiments, sensor data can comprise sensor data captured by one or more user computing devices (e.g., user mobile devices). For example, drivers and/or riders participating in a ridesharing service may carry one or more user computing devices. Such user computing devices may comprise cameras that can capture image and/or video data, GPS receivers that can capture location data, one or more microphones that can capture audio data, and the like. As such, input data can comprise image data, video data, audio data, location data, or any other data that may be captured using sensors on user computing devices.

In certain embodiments, sensor data can comprise sensor data captured by one or more sensors mounted to a vehicle (e.g., the fleet of vehicles 212). For example, certain vehicles, whether manually, autonomously, or semi-autonomously operated, may comprise one or more sensors mounted to the vehicle. Such sensors may include lidar systems that can capture lidar data, radar systems that can capture radar data, camera systems that can capture image and/or video data, microphones that can capture audio data, positioning systems that can capture location data, and the like. As such, input data can comprise lidar data, radar data, image data, video data, audio data, location data, or any other data that may be captured using sensors mounted on a vehicle. As will be described in greater detail below, input data received by the information collection module 204 can be used to determine a quality level for various regions in a map, and can also be used to determine any missing or required information that may be needed to upgrade a map region to a higher quality level.

In certain embodiments, the information collection module 204 can be configured to make various inferences or draw conclusions based on the input data received by the information collection module 204. Such inferences may include, for example, the approximate positions of physical objects and/or features in a geographic region. For example, consider an example situation in which a ridesharing service driver's mobile device is used to capture sensor data as the driver drives through a particular geographic region. An image captured by the driver's mobile device may include a stop sign. A machine learning model (e.g., an object recognition model) can recognize that the image depicts a stop sign. Furthermore, location data indicative of the location of the mobile device at the time the image was captured can be used to estimate the location of the stop sign within the geographic region, and map information can be updated to indicate the approximate position of the stop sign within a map. In this way, input data received by the information collection module 204 can be used to add information to a map or improve information in the map. Similarly, consider a further example situation in which a vehicle comprises a sensor suite with more accurate, higher resolution sensors, such as high definition cameras, lidar systems, radar systems, and the like. The vehicle can drive through the same geographic region, and capture image data, lidar data, and/or radar data indicating the position of the same stop sign with greater accuracy than was possible using only the previous driver's mobile device. As such, using the sensor data captured by the vehicle, map information can be updated with an even more accurate estimate of the position of the stop sign within the map.

The information verification module 206 can be configured to provide features and/or tools to verify map information. In various embodiments, verification of map information may be performed by human operators and/or automatically performed by machine learning models. As mentioned above, the information collection module 204 can receive input data. Such input data can comprise base map information and/or sensor information captured by various sensors. Furthermore, the information collection module 204 may make various inferences based on the input data and map information can be updated based on those inferences. Such inferences may comprise, for example, geometric information indicative of the physical locations of physical features within a map (e.g., the positions of traffic lights, crosswalks, road signs, lane boundaries, other road markings, buildings, and the like). Furthermore, such inferences may comprise semantic information providing further context pertaining to the physical features identified in the geometric information. For example, semantic information may include the direction of travel in a particular lane, the speed limit for a particular road segment, and the like. The information verification module 206 can be configured to confirm the accuracy of available map information. For example, a human operator may be provided with a user interface that allows the human operator to view and confirm the accuracy of map information (e.g., geometric and/or semantic information) and/or to confirm the accuracy of machine learning models that have low confidence.

Figure 3A:
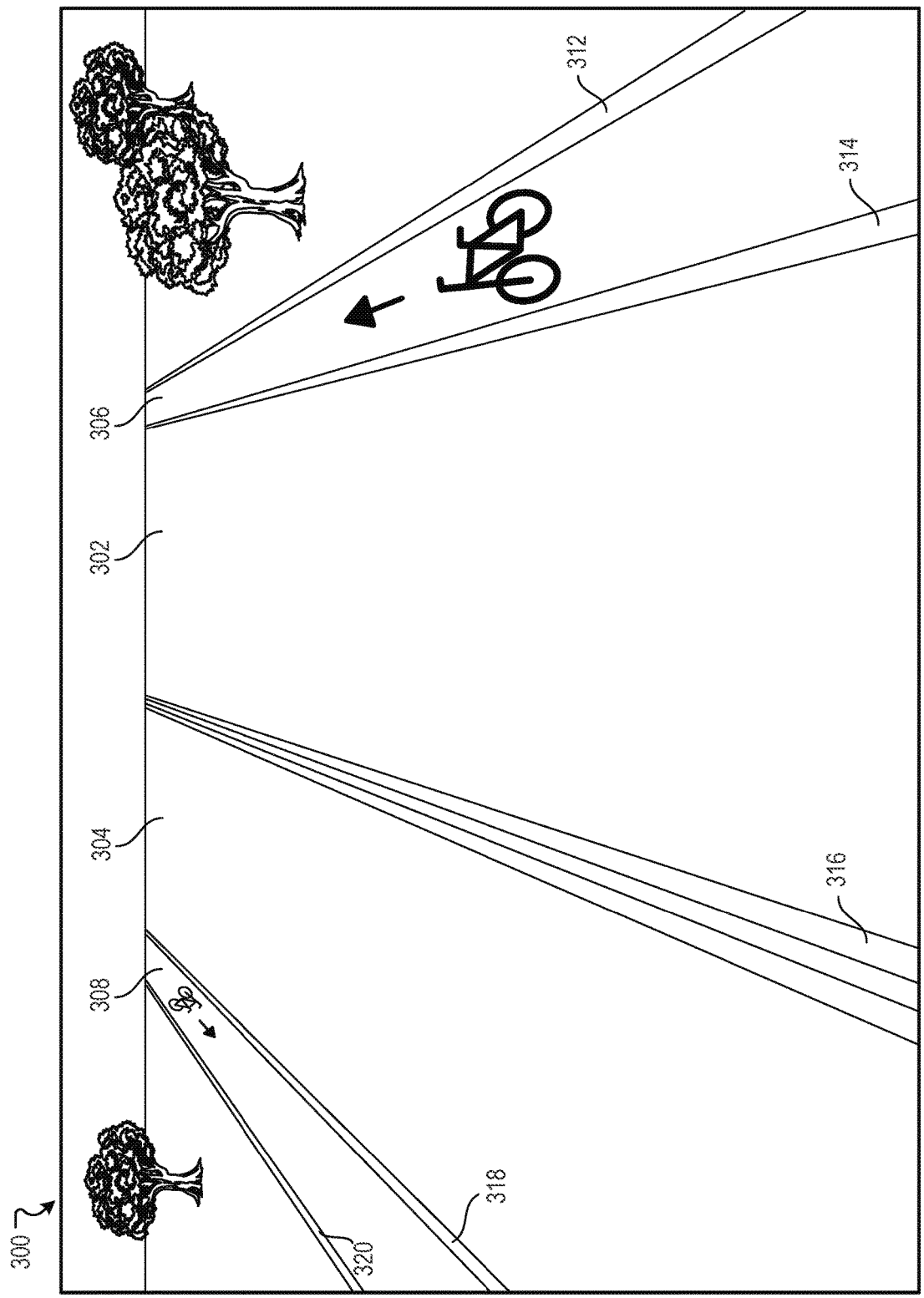
FIGS. 3A-C illustrate an example situation demonstrating verification of semantic map information, according to an embodiment of the present technology.
Figure 3B:
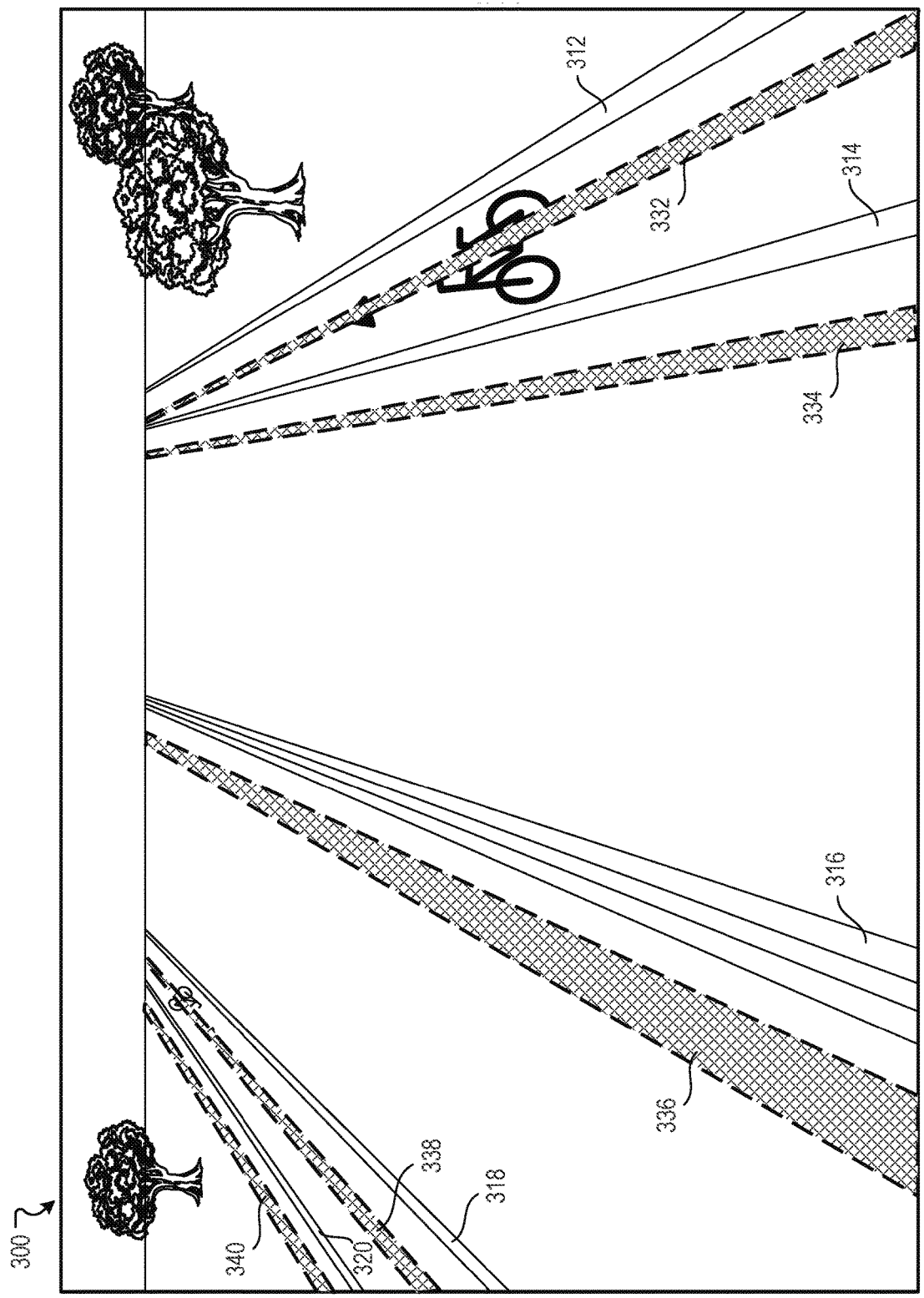
Figure 3C:
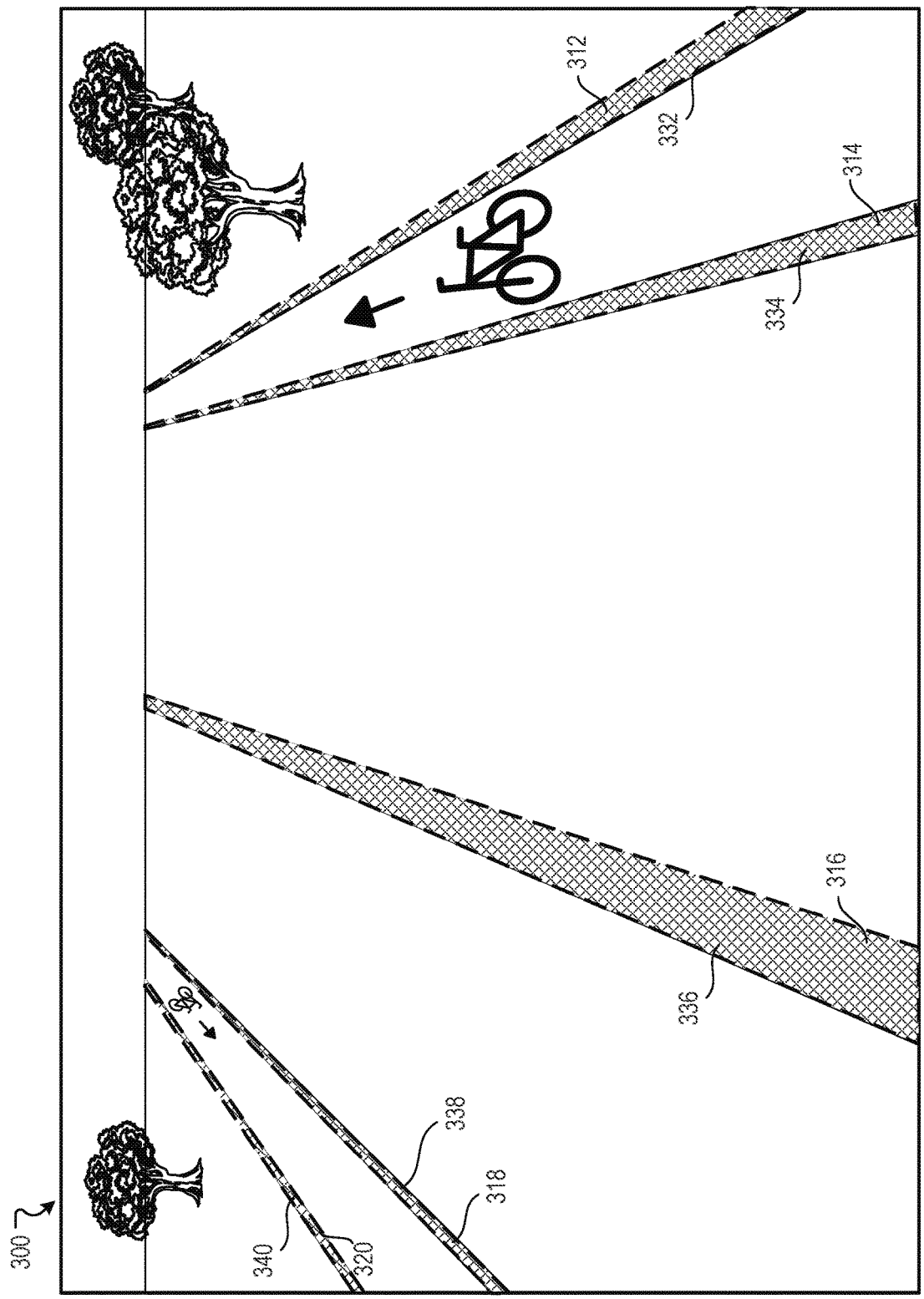

FIGS. 3A-3C illustrate an example situation that demonstrates verification of map information, according to an embodiment of the present technology. FIG. 3A depicts an image 300. The image 300 may have been captured, for example, by a camera mounted to a vehicle while a lidar system mounted to the vehicle captured lidar data that was used to generate a point cloud and three-dimensional geometric information for a geographic region. The image 300 may be associated with image location data which can be used to determine a geographic location from which the image was captured. The image 300 may also be associated with camera information describing an angle of view of the camera that captured the first image, the position, orientation, and/or direction of the camera when the first image was captured, and the like. The image 300 depicts lane markers 312, 314, 316, 318, 320 which define two bike lanes 306, 308 and two road lanes 302, 304.

As discussed above, map information can be inferred based on sensor data. For example, in the example situation depicted, sensor data (e.g., image data, lidar data) can be used to infer and/or estimate the positions of the lane markers 312, 314, 316, 318, 320 within a map such that map information may comprise the estimated positions of the lane markers 312, 314, 316, 318, 320.

In FIG. 3B, the estimated positions of the lane markers 312, 314, 316, 318, 320 contained within the map information have been overlaid on the image using overlays 340, 338, 336, 334, 332. For example, if the approximate position from which the image 300 was captured can be determined within the map, and the orientation of the camera can be determined, and the map information comprises estimated positions for the lane markers 312, 314, 316, 318, 320, an estimate can be made as to where those lane markers would be depicted in the image 300. However, in the situation shown in FIG. 3B, the positions of the overlays 340, 338, 336, 334, 332 are not very accurate, indicating that the map information is not particularly accurate. The human operator can be provided with an option to indicate whether the semantic information depicted in the image 300 (e.g., the positions of the overlays 340, 338, 336, 334, 332) is accurate or inaccurate. In an embodiment, the human operator can also be provided with the option to correct any incorrectly positioned semantic information. In certain embodiments, confirmation and/or correction of semantic information may be automated by using multiple observations of the same object across multiple devices. For example, if the same lane marker is seen ten times by ten different vehicles, it will likely have a geospatial position that is more accurate than if it had been observed only once. The number of observations may obviate the need for humans to confirm, or may place the object more accurately than a human could. In FIG. 3C, the semantic information is accurately positioned over the lane markers. As such, the operator may indicate that this portion of the map information is accurate and has been verified by a human operator. While the example of lane marker positioning has been demonstrated here, it should be understood that any semantic information or 3D representation of a map element contained in map information can be verified by a human operator and/or a machine learning model. For example, the image 300 may demonstrate the direction of travel of a particular lane, and/or the speed limit of the lane, or the position of a crosswalk or traffic signal, and the human operator can indicate whether the information is accurate.

In certain embodiments, verification of map information may be performed automatically by one or more machine learning models. For example, a model may be trained to identify the likely positions of various physical features in an image, and to determine whether semantic information overlaid on the image accurately identifies the positions of the physical features depicted in the image. As will be described in greater detail below with reference to the map information module 208, verification of map information can be utilized to determine whether map information is sufficiently accurate to be assigned a particular quality level (e.g., a particular quality score), or whether additional information is needed to improve the accuracy of the map information.

Returning to FIG. 2, the map information module 208 can be configured to maintain and update map information based on input data. As mentioned above, map information can define a map of a geographic region. In an embodiment, portions and/or regions of a map and/or individual map elements can be assigned a quality level based on the quality of information available for that region. The map information can include the quality level information for the various regions of the map. For example, if a particular region of a map has only base map information (e.g., because no sensor data is available for that region), that region may be assigned a lowest quality level (e.g., a lowest quality score). In contrast, if a particular region of the map has sufficiently accurate and detailed information such that autonomous vehicles can safely operate in that region based on the available map information, the region may be assigned a highest quality level (e.g., a highest quality score). In certain embodiments, a highest quality level may be associated not only with safe operation of autonomous vehicles, but also safe operation with "high elegance," i.e., safe operation while also taking into account various rider comfort considerations, as will be described in greater detail herein. One or more intermediate quality levels may be defined between the lowest quality level and the highest quality level.

Figure 4A:
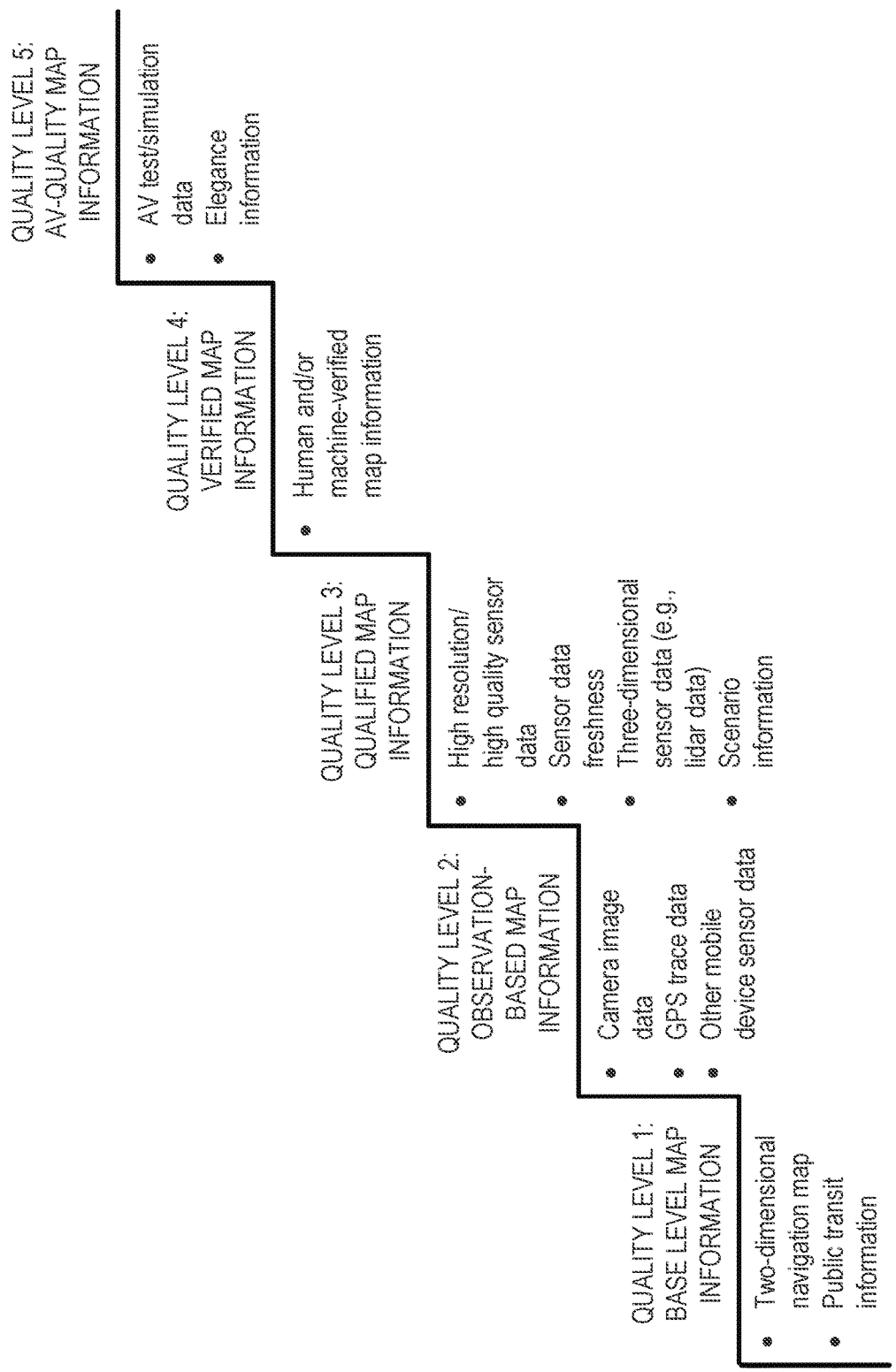
FIG. 4A illustrates example map information quality levels, according to an embodiment of the present technology.

Each quality level may be associated with one or more quality criteria which define the minimum requirements for a map region to be assigned that quality level. Quality criteria may comprise data resolution criteria, data type criteria, data coverage criteria, data volume criteria, data accuracy criteria, information verification criteria, test result criteria, information freshness criteria, and the like, various examples of which will be described below. For example, consider an example situation in which five quality levels are defined. FIG. 4A illustrates an example set of five quality levels. A lowest quality level may be associated with base level map information, and may require only that base map information is available for a region. A second quality level may require that some level of sensor data is available throughout a region (e.g., for a threshold percentage of the region). For example, the second quality level may require that sensor data from user mobile devices and/or from vehicles, such as camera image data and/or GPS trace data, is available for a threshold percentage of the region.

A third quality level may require that high quality sensor data is available throughout a region (e.g., for a threshold percentage of the region). For example, the third quality level may require, at a minimum, that three-dimensional lidar data and high definition image data are available for a threshold percentage of the region. Furthermore, the third quality level may comprise information freshness criteria requiring that sensor data for the region must have been captured within a threshold period of time (e.g., within the last week, the last month, etc.). The third quality level may also be associated with and/or require availability of scenario information for a geographic region. In this regard, the geographic region or road segments thereof can be associated with various scenarios. Scenario information associated with a geographic region can include information describing objects, events, context, and risk associated with navigation through the geographic region. For example, scenarios can include children walking through a crosswalk, pedestrians crossing a road, debris blocking a lane of a highway, hazardous activity involving other vehicles, to name some examples. A scenario can be associated with a set of features (e.g., objects, road features, contextual features) which, when detected, can be used to recognize the scenario. Scenario information can be used to inform appropriate action, such as route planning, navigation decision-making, area avoidance, and the like.

A fourth quality level may require that the accuracy of map information in a region has been verified by a human operator and/or a machine learning model, various example of which were discussed above with reference to the information verification module 206. In this example implementation, the fourth quality level may indicate that there is sufficient map information and sufficiently accurate map information that an autonomous vehicle could potentially operate using the available map information.

A fifth and highest quality level may be associated with AV-quality map information and may indicate that an autonomous vehicle can safely operate within a particular region. The fifth quality level may comprise test result criteria which requires a threshold level of autonomous vehicle testing in the region, and a threshold success rate and/or a threshold safety metric for autonomous vehicles tested in the region. For example, the test result criteria may comprise a minimum number of autonomous vehicle test drives in the region (e.g., with a human operator that can disengage the autonomous vehicle to avoid accidents, or simulated test drives) and a minimum safety metric threshold for those test drives (e.g., a maximum number of disengagements, or maximum number of simulated negative events).

While the example implementation discussed above identifies "AV-quality map information" as being associated with a highest quality level, in certain embodiments, a plurality of quality levels may comprise one or more quality levels above AV-quality map information. For example, in the example implementation discussed above, the plurality of quality levels may comprise a sixth quality level indicative of not only AV-quality map information, but AV-quality map information with high elegance which takes into account one or more rider comfort considerations. For example, once a particular map region has been determined to be safe for autonomous vehicle operation, additional sensor data can be obtained in order to improve rider comfort when traveling in autonomous vehicles within the region. For example, G-force and/or acceleration data can be obtained which can be used to adjust autonomous vehicle performance such that an autonomous vehicle traveling within the region can ensure that users do not experience greater than a threshold level of acceleration or a threshold level of G-forces.

While the example implementation above has discussed various types of information and quality criteria associated with particular quality levels (e.g., a first, second, third, fourth, and/or fifth quality level), it should be understood that such associations are provided only for purposes of explanation, and are intended as examples rather than limitations on the recited features. For example, rather than five quality levels, more or fewer quality levels may be used. Or rather than a second quality level being associated with sensor data, a first or third quality level may be associated with sensor data (e.g., have sensor data quality criteria). Each of the example types of information and the example quality criteria can be applied in various combinations to different quality levels.

FIG. 4B illustrates an example 400 including an example map 402. The map 402 depicts quality level information for various regions within the geographic region depicted in the map 402. In the example 400, there are five different quality levels, and each region in the map 402 is assigned a quality level based on the map information available for that region, and whether the map information satisfies the quality criteria required for a particular quality level. In other embodiments, a map of a geographic region can depict quality level information for various regions within the geographic region using a different number of quality levels (e.g., three quality levels, six quality levels, etc.).

Returning to FIG. 2, the map information module 208 can be configured to assign each region in a map a quality level based on the map information available for that region. In one embodiment, each quality level may be associated with a quality score or a range of quality scores. For example, in a situation in which there are five quality levels, as described above, the lowest quality level may be assigned a score of 1, the second quality level may be assigned a score of 20, the third quality level may be assigned a score of 40, the fourth quality level may be assigned a score of 75, and the fifth quality level may be assigned a score of 100. The quality levels and/or the quality scores may be indicative of the quality of map information (e.g., completeness and/or accuracy of map information) available for a particular geographic region. As time passes, and additional input data is received and/or map information grows older and potentially stale, the map information module 208 can update (e.g., upgrade or downgrade) the quality level assigned to each region in the map accordingly.

In certain embodiments, the information collection module 204 and/or the map information module 208 may receive input data which indicates a change in a geographic region. For example, a vehicle driving through a region may capture sensor data that indicates a change to one or more map elements in the region (e.g., new/removed stop sign, new/removed traffic light, new crosswalk, changed lane patterns, etc.). Such changes may cause the map information module 208 to adjust (e.g., downgrade) the quality level of the region to account for the changes to the geographic region.

In certain embodiments, the map information module 208 can be configured to transmit updated map information to one or more computing devices (e.g., user computing devices and/or vehicle computing devices). As discussed above, as vehicles and/or users traverse different geographic regions, they collect and provide updated input data (e.g., sensor data). The updated input data can be used to update map information, including updating quality level information for different regions in the map. As such, map information can be changing dynamically, as different regions can be updated with more accurate information, and updated information may result in changes to quality levels assigned for particular regions. The map information module 208 can then push out updated map information to entities that may rely on map information (e.g., vehicles, drivers, riders) periodically and/or in real-time.

The map information utilization module 210 can be configured to utilize map information to take various actions. As discussed above, map information can comprise input data (e.g., sensor data) collected for various geographic regions, inferences, estimations, and/or determinations made based on the input data (e.g., geometric and/or semantic information inferred, estimated, and/or determined based on the input data), verification information indicating whether map information has been verified by a human operator or a machine model, test result information for different geographic regions, quality level information for different geographic regions, and the like. The map information utilization module 210 can be configured to take various actions based on this information.

In an embodiment, the map information utilization module 210 can be configured to automatically schedule and/or queue one or more tasks in order to improve the quality level for a region (e.g., to satisfy one or more quality criteria associated with a higher quality level). For example, using the example situation discussed above in which a map portion may be assigned one of five quality levels, if a particular geographic region is assigned the lowest quality level (indicative of only base level map information being available for that region), the map information utilization module 210 can cause user computing devices in that region to capture and provide sensor data such that, eventually, the geographic region can be upgraded to the second quality level. If a particular geographic region is assigned the second quality level (indicative of low-quality sensor data being available for a threshold percentage of the geographic region), the map information utilization module 210 can schedule vehicles with high-quality sensors mounted to travel through the geographic region to capture high-quality sensor data so that the geographic region can be upgraded to the third quality level. If the particular geographic region is assigned the third quality level (indicative of high-quality sensor data being available for a threshold percentage of the geographic region), the map information utilization module 210 can schedule a human operator to review and verify map information for the geographic region so that the geographic region can be upgraded to the fourth quality level. If a human operator reviews the map information and cannot verify its accuracy, the map information utilization module 210 can cause vehicles to be scheduled and/or instructed to travel through the geographic region to capture additional sensor data in order to improve the accuracy of the available map information. If a particular geographic region is assigned the fourth quality level (indicative of verified, highly accurate map information), the map information utilization module 210 can schedule test drives of autonomous vehicles with human operators or human-operated vehicles with AV quality sensor suites through the geographic region, or schedule simulations of autonomous vehicles through the geographic region, so that the geographic region can be upgraded to the fifth quality level. While various example quality levels and associated quality criteria are described herein, it should be understood that the present technology is not limited to the specific examples provided, and many variations are possible. For example, more or fewer quality levels can be defined, and each quality level may have different, more, or fewer quality criteria, and the like.

In an embodiment, the map information utilization module 210 can be configured to automatically schedule and/or queue one or more tasks in order to maintain the quality level for a region (e.g., to continue to satisfy one or more quality criteria associated with the quality level assigned to the region). For example, a particular quality level may be associated with a sensor data age threshold (or freshness threshold) such that sensor data must have been captured within a threshold period of time in order to satisfy the quality criteria for that quality level. If, for a particular region, sensor data is about to exceed the age threshold such that the region is at risk of being downgraded to a lower quality level, the map information utilization module 210 can automatically schedule and/or instruct vehicles with mounted sensors to travel through the geographic region in order to update the sensor data and keep it up to date. In another example, if a highest quality level (indicative of AV-quality map information) requires a threshold number of autonomous trips through a region within a threshold period of time, and a particular region is at risk of falling below the threshold number of autonomous trips, the map information utilization module 210 can automatically schedule autonomous vehicles to drive through the region in order to maintain the quality level of the region. Many variations are possible. In certain embodiments, the map information utilization module 210 may be configured to prioritize certain tasks over others based on an order of priority. For example, the map information utilization module 210 may prioritize scheduling tasks to address critical changes in map information (e.g., a new stop sign, a new traffic light, changed lanes, etc.); a second priority could be mapping a new area to balance traffic considerations, improve ETAs, lower insurance costs for covering an area, etc.; a third party could be to address time-based decay to "refresh" a geographic area, etc. Many variations are possible.

In an embodiment, the map information utilization module 210 can be configured to automatically perform ridesharing tasks based on map information, including quality level information. For example, in an embodiment, if a particular region has been identified as having AV-quality map information, the map information utilization module 210 can permit and/or cause autonomous vehicles to be deployed and operated within that region. For example, if a ridesharing request can be carried out entirely within a geographic region for which AV-quality map information is available, the map information utilization module 210 can cause an autonomous vehicle to be assigned to the ridesharing request. In contrast, if a particular region has been identified as not having AV-quality map information, the map information utilization module 210 can cause autonomous vehicles to not be deployed or operated within that region. For example, if a ridesharing request cannot be carried out entirely within a region with AV-quality map information, the map information utilization module 210 can cause a human operated vehicle to be assigned to the ridesharing request. In yet another example, if a ridesharing request can be carried out entirely within a geographic region for which AV-quality map information is available, but an autonomous route would require a more circuitous route in order to avoid regions for which AV-quality map information is not available, a user may be provided with a lower fare for accepting an autonomous vehicle.

Figure 5:
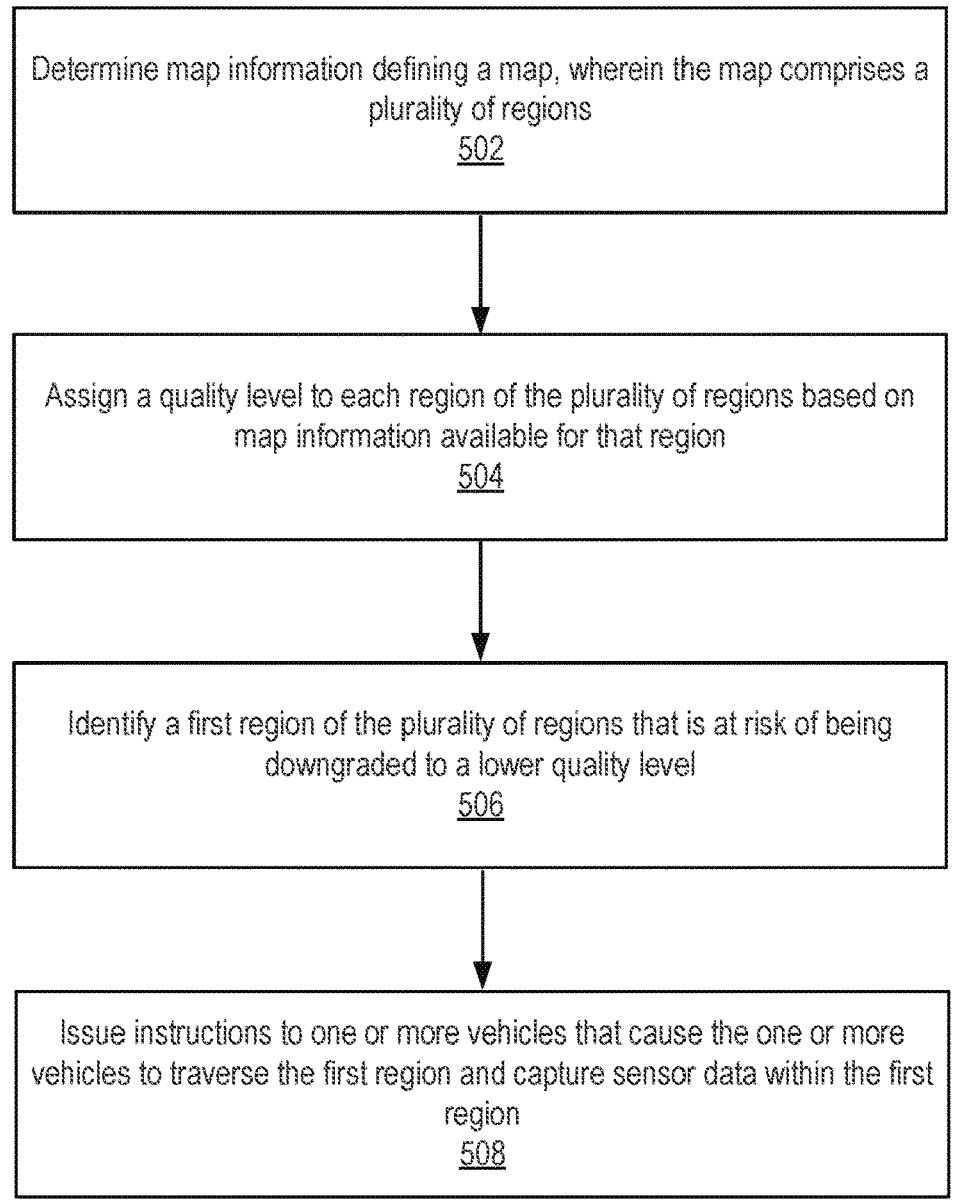
FIG. 5 illustrates an example method, according to an embodiment of the present technology.

FIG. 5 illustrates an example method 500, according to an embodiment of the present technology. At block 502, the example method 500 can determine map information defining a map, wherein the map comprises a plurality of regions. At block 504, the example method 500 can assign a quality level for each region of the plurality of regions based on map information available for that region. At block 506, the example method 500 can identify a first region of the plurality of regions that is at risk of being downgraded to a lower quality level. At block 508, the example method 500 can issue instructions to one or more vehicles that cause the one or more vehicles to traverse the first region and capture sensor data within the first region.

Many variations to the example method are possible. It should be appreciated that there can be additional, fewer, or alternative steps performed in similar or alternative orders, or in parallel, within the scope of the various embodiments discussed herein unless otherwise stated.

Figure 6:
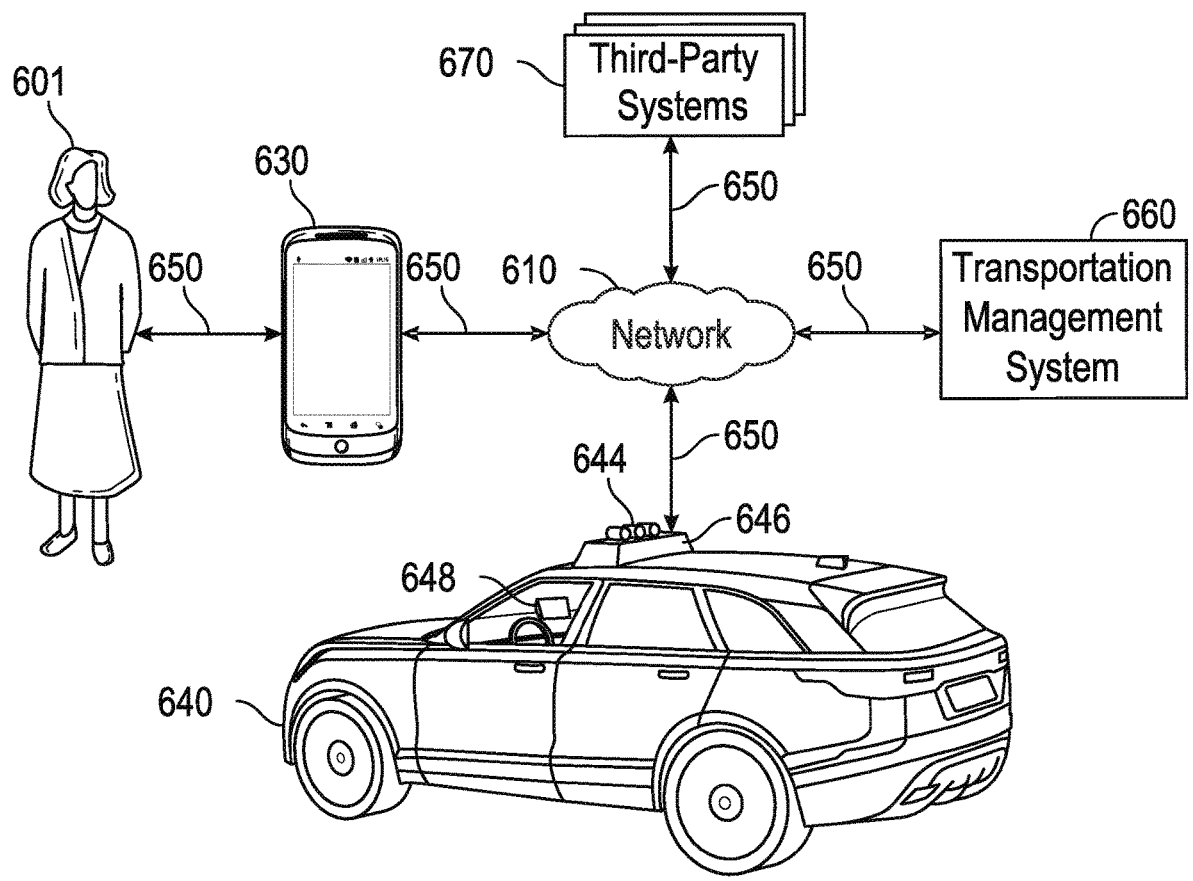
FIG. 6 illustrates an example block diagram of a transportation management environment, according to an embodiment of the present technology.

FIG. 6 illustrates an example block diagram of a transportation management environment for matching ride requestors with vehicles. In particular embodiments, the environment may include various computing entities, such as a user computing device 630 of a user 601 (e.g., a ride provider or requestor), a transportation management system 660, a vehicle 640, and one or more third-party systems 670. The vehicle 640 can be autonomous, semi-autonomous, or manually drivable. The computing entities may be communicatively connected over any suitable network 610. As an example and not by way of limitation, one or more portions of network 610 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 6 illustrates a single user device 630, a single transportation management system 660, a single vehicle 640, a plurality of third-party systems 670, and a single network 610, this disclosure contemplates any suitable number of each of these entities. As an example and not by way of limitation, the network environment may include multiple users 601, user devices 630, transportation management systems 660, vehicles 640, third-party systems 670, and networks 610. In some embodiments, some or all modules shown in FIG. 2 may be implemented by one or more computing systems of the transportation management system 660. In some embodiments, some or all modules shown in FIG. 2 may be implemented by one or more computing systems in the vehicle 640. In some embodiments, some or all modules shown in FIG. 2 may be implemented by the user device 630.

The user device 630, transportation management system 660, vehicle 640, and third-party system 670 may be communicatively connected or co-located with each other in whole or in part. These computing entities may communicate via different transmission technologies and network types. For example, the user device 630 and the vehicle 640 may communicate with each other via a cable or short-range wireless communication (e.g., Bluetooth, NFC, WI-FI, etc.), and together they may be connected to the Internet via a cellular network that is accessible to either one of the devices (e.g., the user device 630 may be a smartphone with LTE connection). The transportation management system 660 and third-party system 670, on the other hand, may be connected to the Internet via their respective LAN/WLAN networks and Internet Service Providers (ISP). FIG. 6 illustrates transmission links 650 that connect user device 630, vehicle 640, transportation management system 660, and third-party system 670 to communication network 610. This disclosure contemplates any suitable transmission links 650, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 650 may connect to one or more networks 610, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 650. For example, the user device 630 may communicate with the transportation management system via a cellular network and the Internet, but communicate with the vehicle 640 via Bluetooth or a physical wire connection.

In particular embodiments, the transportation management system 660 may fulfill ride requests for one or more users 601 by dispatching suitable vehicles. The transportation management system 660 may receive any number of ride requests from any number of ride requestors 601. In particular embodiments, a ride request from a ride requestor 601 may include an identifier that identifies the ride requestor in the system 660. The transportation management system 660 may use the identifier to access and store the ride requestor's 601 information, in accordance with the requestor's 601 privacy settings. The ride requestor's 601 information may be stored in one or more data stores (e.g., a relational database system) associated with and accessible to the transportation management system 660. In particular embodiments, ride requestor information may include profile information about a particular ride requestor 601. In particular embodiments, the ride requestor 601 may be associated with one or more categories or types, through which the ride requestor 601 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 660 may classify a user 601 based on known information about the user 601 (e.g., using machine-learning classifiers), and use the classification to retrieve relevant aggregate information associated with that class. For example, the system 660 may classify a user 601 as a young adult and retrieve relevant aggregate information associated with young adults, such as the type of music generally preferred by young adults.

Transportation management system 660 may also store and access ride information. Ride information may include locations related to the ride, traffic data, route options, optimal pick-up or drop-off locations for the ride, or any other suitable information associated with a ride. As an example and not by way of limitation, when the transportation management system 660 receives a request to travel from San Francisco International Airport (SFO) to Palo Alto, Calif., the system 660 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 660. For example, historical data may include aggregate information generated based on past ride information, which may include any ride information described herein and telemetry data collected by sensors in vehicles and user devices. Historical data may be associated with a particular user (e.g., that particular user's preferences, common routes, etc.), a category/class of users (e.g., based on demographics), and all users of the system 660. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 660 in particular embodiments may predict and provide ride suggestions in response to a ride request. In particular embodiments, the system 660 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and semi-supervised learning based on a mixture of labeled and unlabeled training data.

In particular embodiments, transportation management system 660 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 660 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 630 (which may belong to a ride requestor or provider), a transportation management system 660, vehicle system 640, or a third-party system 670 to process, transform, manage, retrieve, modify, add, or delete the information stored in the data store.

In particular embodiments, transportation management system 660 may include an authorization server (or any other suitable component(s)) that allows users 601 to opt-in to or opt-out of having their information and actions logged, recorded, or sensed by transportation management system 660 or shared with other systems (e.g., third-party systems 670). In particular embodiments, a user 601 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 601 of transportation management system 660 through blocking, data hashing, anonymization, or other suitable techniques as appropriate.

In particular embodiments, third-party system 670 may be a network-addressable computing system that may provide HD maps or host GPS maps, customer reviews, music or content, weather information, or any other suitable type of information. Third-party system 670 may generate, store, receive, and send relevant data, such as, for example, map data, customer review data from a customer review website, weather data, or any other suitable type of data. Third-party system 670 may be accessed by the other computing entities of the network environment either directly or via network 610. For example, user device 630 may access the third-party system 670 via network 610, or via transportation management system 660. In the latter case, if credentials are required to access the third-party system 670, the user 601 may provide such information to the transportation management system 660, which may serve as a proxy for accessing content from the third-party system 670.

In particular embodiments, user device 630 may be a mobile computing device such as a smartphone, tablet computer, or laptop computer. User device 630 may include one or more processors (e.g., CPU, GPU), memory, and storage. An operating system and applications may be installed on the user device 630, such as, e.g., a transportation application associated with the transportation management system 660, applications associated with third-party systems 670, and applications associated with the operating system. User device 630 may include functionality for determining its location, direction, or orientation, based on integrated sensors such as GPS, compass, gyroscope, or accelerometer. User device 630 may also include wireless transceivers for wireless communication and may support wireless communication protocols such as Bluetooth, near-field communication (NFC), infrared (IR) communication, WI-FI, and 2G/3G/4G/LTE mobile communication standard. User device 630 may also include one or more cameras, scanners, touchscreens, microphones, speakers, and any other suitable input-output devices.

In particular embodiments, the vehicle 640 may be equipped with an array of sensors 644, a navigation system 646, and a ride-service computing device 648. In particular embodiments, a fleet of vehicles 640 may be managed by the transportation management system 660. The fleet of vehicles 640, in whole or in part, may be owned by the entity associated with the transportation management system 660, or they may be owned by a third-party entity relative to the transportation management system 660. In either case, the transportation management system 660 may control the operations of the vehicles 640, including, e.g., dispatching select vehicles 640 to fulfill ride requests, instructing the vehicles 640 to perform select operations (e.g., head to a service center or charging/fueling station, pull over, stop immediately, self-diagnose, lock/unlock compartments, change music station, change temperature, and any other suitable operations), and instructing the vehicles 640 to enter select operation modes (e.g., operate normally, drive at a reduced speed, drive under the command of human operators, and any other suitable operational modes).

In particular embodiments, the vehicles 640 may receive data from and transmit data to the transportation management system 660 and the third-party system 670. Examples of received data may include, e.g., instructions, new software or software updates, maps, 3D models, trained or untrained machine-learning models, location information (e.g., location of the ride requestor, the vehicle 640 itself, other vehicles 640, and target destinations such as service centers), navigation information, traffic information, weather information, entertainment content (e.g., music, video, and news) ride requestor information, ride information, and any other suitable information. Examples of data transmitted from the vehicle 640 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 640, passengers may send/receive data to the transportation management system 660 and third-party system 670), and any other suitable data.

In particular embodiments, vehicles 640 may also communicate with each other, including those managed and not managed by the transportation management system 660. For example, one vehicle 640 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) or over a network (e.g., the Internet or via the transportation management system 660 or third-party system 670), or both.

In particular embodiments, a vehicle 640 may obtain and process sensor/telemetry data. Such data may be captured by any suitable sensors. For example, the vehicle 640 may have a Light Detection and Ranging (LiDAR) sensor array of multiple LiDAR transceivers that are configured to rotate 360°, emitting pulsed laser light and measuring the reflected light from objects surrounding vehicle 640. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a three-dimensional (3D) model of the external environment of the vehicle 640. As an example and not by way of limitation, the 3D model may represent the external environment including objects such as other cars, curbs, debris, objects, and pedestrians up to a maximum range of the sensor arrangement (e.g., 50, 100, or 200 meters). As another example, the vehicle 640 may have optical cameras pointing in different directions. The cameras may be used for, e.g., recognizing roads, lane markings, street signs, traffic lights, police, other vehicles, and any other visible objects of interest. To enable the vehicle 640 to "see" at night, infrared cameras may be installed. In particular embodiments, the vehicle may be equipped with stereo vision for, e.g., spotting hazards such as pedestrians or tree branches on the road. As another example, the vehicle 640 may have radars for, e.g., detecting other vehicles and hazards afar. Furthermore, the vehicle 640 may have ultrasound equipment for, e.g., parking and obstacle detection. In addition to sensors enabling the vehicle 640 to detect, measure, and understand the external world around it, the vehicle 640 may further be equipped with sensors for detecting and self-diagnosing the vehicle's own state and condition. For example, the vehicle 640 may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, the vehicle 640 may build a 3D model of its surrounding based on data from its LiDAR, radar, sonar, and cameras, along with a pre-generated map obtained from the transportation management system 660 or the third-party system 670. Although sensors 644 appear in a particular location on the vehicle 640 in FIG. 6, sensors 644 may be located in any suitable location in or on the vehicle 640. Example locations for sensors include the front and rear bumpers, the doors, the front windshield, on the side panel, or any other suitable location.

In particular embodiments, the vehicle 640 may be equipped with a processing unit (e.g., one or more CPUs and GPUs), memory, and storage. The vehicle 640 may thus be equipped to perform a variety of computational and processing tasks, including processing the sensor data, extracting useful information, and operating accordingly. For example, based on images captured by its cameras and a machine-vision model, the vehicle 640 may identify particular types of objects captured by the images, such as pedestrians, other vehicles, lanes, curbs, and any other objects of interest.

In particular embodiments, the vehicle 640 may have a navigation system 646 responsible for safely navigating the vehicle 640. In particular embodiments, the navigation system 646 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 646 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 646 may use its determinations to control the vehicle 640 to operate in prescribed manners and to guide the vehicle 640 to its destinations without colliding into other objects. Although the physical embodiment of the navigation system 646 (e.g., the processing unit) appears in a particular location on the vehicle 640 in FIG. 6, navigation system 646 may be located in any suitable location in or on the vehicle 640. Example locations for navigation system 646 include inside the cabin or passenger compartment of the vehicle 640, near the engine/battery, near the front seats, rear seats, or in any other suitable location.

In particular embodiments, the vehicle 640 may be equipped with a ride-service computing device 648, which may be a tablet or any other suitable device installed by transportation management system 660 to allow the user to interact with the vehicle 640, transportation management system 660, other users 601, or third-party systems 670. In particular embodiments, installation of ride-service computing device 648 may be accomplished by placing the ride-service computing device 648 inside the vehicle 640, and configuring it to communicate with the vehicle 640 via a wired or wireless connection (e.g., via Bluetooth). Although FIG. 6 illustrates a single ride-service computing device 648 at a particular location in the vehicle 640, the vehicle 640 may include several ride-service computing devices 648 in several different locations within the vehicle. As an example and not by way of limitation, the vehicle 640 may include four ride-service computing devices 648 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 648 may be detachable from any component of the vehicle 640. This may allow users to handle ride-service computing device 648 in a manner consistent with other tablet computing devices. As an example and not by way of limitation, a user may move ride-service computing device 648 to any location in the cabin or passenger compartment of the vehicle 640, may hold ride-service computing device 648, or handle ride-service computing device 648 in any other suitable manner. Although this disclosure describes providing a particular computing device in a particular manner, this disclosure contemplates providing any suitable computing device in any suitable manner.

Figure 7:
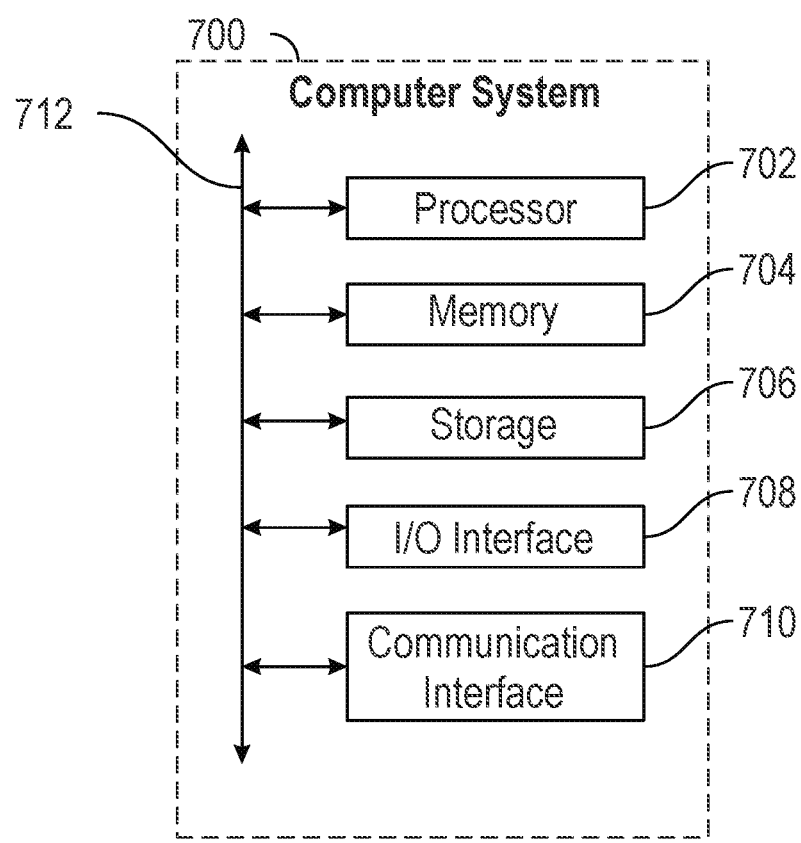
FIG. 7 illustrates an example of a computer system or computing device that can be utilized in various scenarios, according to an embodiment of the present technology.

FIG. 7 illustrates an example computer system 700. In particular embodiments, one or more computer systems 700 perform one or more steps of one or more methods described or illustrated herein. In particular embodiments, one or more computer systems 700 provide the functionalities described or illustrated herein. In particular embodiments, software running on one or more computer systems 700 performs one or more steps of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 that are to be operated on by computer instructions; the results of previous instructions executed by processor 702 that are accessible to subsequent instructions or for writing to memory 704 or storage 706; or any other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs), be a multi-core processor, or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described in further detail below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware or software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware or software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware or software, or both coupling components of computer system 700 to each other. As an example and not by way of limitation, bus 712 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method comprising:
   determining, by a computing system,
      whether a quality criteria associated with a first feature of a map region satisfies a first quality level for enabling a first transportation mode to navigate the map region including the first feature, wherein the first feature is based on sensor data captured by one or more vehicles;
   subsequent to determining, by the computing system, the quality criteria associated with the first feature of the map region is insufficient to satisfy the first quality level;
   determining, by the computing system, additional information associated with the sensor data required to satisfy the first quality level; and
   providing, by the computing system, instructions to the one or more vehicles to capture the additional information for the quality criteria required to satisfy the first quality level such as to navigate the first navigation mode in the map region including the first feature.

2. The method of claim 1, wherein the first navigation mode is associated with at least one of: manual navigation, rideshare navigation, public transit navigation, semiautonomous navigation, autonomous navigation, or autonomous navigation with comfort considerations.

3. The method of claim 1, wherein the map region includes the first feature and a second feature associated with a second quality level for navigating a second navigation mode in the map region including the second feature.

4. The method of claim 1, further comprising:
   determining, by the computing system, a priority associated with a change to the first feature in the map region; and
   providing, by the computing system, instructions for the first transportation mode to travel through the map region for a threshold number of trips within a threshold period of time based on the priority.

5. The method of claim 1, further comprising:
receiving, by the computing system, additional sensor data that indicates a change to the first feature in the map region, wherein the determining the first feature of the map region does not satisfy the quality criteria associated with the first quality level is based on the additional sensor data.

6. The method of claim 1, further comprising:
determining, by the computing system, that map data associated with a second feature in the map region will exceed an age threshold; and
providing, by the computing system, instructions to schedule capture of new map data in the map region based on the determining that the map data associated with the second feature in the map region will exceed the age threshold.

7. The method of claim 1, wherein the additional information includes a threshold number of autonomous vehicle test drives in the map region that satisfy a minimum safety metric threshold, and wherein the first navigation mode is associated with autonomous navigation.

8. The method of claim 1, wherein the additional information includes G-force data and acceleration data, and wherein the first navigation mode is associated with autonomous navigation with comfort considerations.

9. The method of claim 1, wherein the quality criteria include at least one of data resolution criteria, data type criteria, data coverage criteria, data volume criteria, data accuracy criteria, information verification criteria, test result criteria, or information freshness criteria.

10. The method of claim 1, wherein the instructions to the one or more vehicles to capture the additional information for the quality criteria required to satisfy the first quality level are communicated to a computing device associated with a user or a vehicle.

11. A system comprising:
at least one processor; and
a memory storing instructions that, when executed by the at least one processor, cause the system to perform:
determining whether a quality criteria associated with a first feature of a map region satisfies a first quality level for enabling a first transportation mode to navigate the map region including the first feature, wherein the first feature is based on sensor data captured by one or more vehicles;
subsequent to determining the quality criteria associated with the first feature of the map region is insufficient to satisfy the first quality level;
determining additional information associated with the sensor data required to satisfy the first quality level; and
providing instructions to the one or more vehicles to capture the additional information for the quality criteria required to satisfy the first quality level such as to navigate the first navigation mode in the map region including the first feature.

12. The system of claim 11, wherein the first navigation mode is associated with at least one of: manual navigation, rideshare navigation, public transit navigation, semiautonomous navigation, autonomous navigation, or autonomous navigation with comfort considerations.

13. The system of claim 11, wherein the map region includes the first feature and a second feature associated with a second quality level for navigating a second navigation mode in the map region including the second feature.

14. The system of claim 11, wherein the instructions further cause the system to perform:
determining a priority associated with a change to the first feature in the map region; and
providing instructions for the first transportation mode to travel through the map region for a threshold number of trips within a threshold period of time based on the priority.

15. The system of claim 11, wherein the instructions further cause the system to perform
receiving additional sensor data that indicates a change to the first feature in the map region, wherein the determining the first feature of the map region does not satisfy the quality criteria associated with the first quality level is based on the additional sensor data.

16. A non-transitory computer-readable storage medium including instructions that, when executed by at least one processor of a computing system, cause the computing system to perform:
determining whether a quality criteria associated with a first feature of a map region satisfies a first quality level for enabling a first transportation mode to navigate the map region including the first feature, wherein the first feature is based on sensor data captured by one or more vehicles;
subsequent to determining the quality criteria associated with the first feature of the map region is insufficient to satisfy the first quality level;
determining additional information associated with the sensor data required to satisfy the first quality level; and
providing instructions to the one or more vehicles to capture the additional information for the quality criteria required to satisfy the first quality level such as to navigate the first navigation mode in the map region including the first feature.

17. The non-transitory computer-readable storage medium of claim 16, wherein the first navigation mode is associated with at least one of: manual navigation, rideshare navigation, public transit navigation, semiautonomous navigation, autonomous navigation, or autonomous navigation with comfort considerations.

18. The non-transitory computer-readable storage medium of claim 16, wherein the map region includes the first feature and a second feature associated with a second quality level for navigating a second navigation mode in the map region including the second feature.

19. The non-transitory computer-readable storage medium of claim 16, wherein the instructions further cause the computing system to perform:
determining a priority associated with a change to the first feature in the map region; and
providing instructions for the first transportation mode to travel through the map region for a threshold number of trips within a threshold period of time based on the priority.

20. The non-transitory computer-readable storage medium of claim 16, wherein the instructions further cause the computing system to perform:
receiving additional sensor data that indicates a change to the first feature in the map region, wherein the determining the first feature of the map region does not satisfy the quality criteria associated with the first quality level is based on the additional sensor data.

* * * * *